(12) United States Patent
Donnellan et al.

(10) Patent No.: US 9,135,042 B2
(45) Date of Patent: Sep. 15, 2015

(54) PROVISIONING A SECURE CUSTOMER DOMAIN IN A VIRTUALIZED MULTI-TENANT ENVIRONMENT

(71) Applicant: International Business Machines Corporation, Armonk, NY (US)

(72) Inventors: Sean Donnellan, Gaertringen (DE); Robert K. Floyd, III, Richmond, VT (US); Robert P. Monaco, Croton, NY (US); Holger Mueller, Nomborn (DE); Joseph D. Robinson, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 268 days.

(21) Appl. No.: 13/916,682

(22) Filed: Jun. 13, 2013

(65) Prior Publication Data

US 2014/0373007 A1    Dec. 18, 2014

(51) Int. Cl.
   *G06F 9/455* (2006.01)
(52) U.S. Cl.
   CPC .. *G06F 9/45545* (2013.01); *G06F 2009/45595* (2013.01)
(58) Field of Classification Search
   CPC .................. G06F 9/45545; G06F 2009/45595
   USPC ............................................................ 718/1
   See application file for complete search history.

(56) References Cited

U.S. PATENT DOCUMENTS

| 8,369,333 B2 * | 2/2013 | Hao et al. ...................... 370/392 |
| 2004/0103205 A1 * | 5/2004 | Larson et al. ................. 709/229 |
| 2009/0327392 A1 * | 12/2009 | Tripathi et al. .............. 709/201 |
| 2010/0153945 A1 | 6/2010 | Bansal et al. |
| 2011/0022694 A1 * | 1/2011 | Dalal et al. .................... 709/222 |
| 2011/0090911 A1 | 4/2011 | Hao et al. |

(Continued)

FOREIGN PATENT DOCUMENTS

| CN | 102577256 A | 7/2012 |
| EP | 2491684 A2 | 10/2010 |
| WO | 2011049742 A2 | 4/2011 |
| WO | 2012166139 A1 | 12/2012 |

OTHER PUBLICATIONS

International Search Report; PCT/JP2014/003042, Jun. 6, 2014.

(Continued)

*Primary Examiner* — Emerson Puente
*Assistant Examiner* — Willy W Huaracha
(74) *Attorney, Agent, or Firm* — Garg Law Firm, PLLC; Rakesh Garg; Matthew Chung (57) ABSTRACT

To provision a secure customer domain in a virtualized multi-tenant environment, a virtual machine (VM) is configured for a customer in the customer domain. A first, second, and third virtual network interfaces (VNICs) are configured in the VM. The first VNIC has a first network address within a first address range selected for the customer domain and enables an application on the VM to access a second application in a second VM in the customer domain. The second VNIC enables a third application outside the customer domain to access the VM in the customer domain. The second VNIC is configured to use an addressing specification used by a server of the third application. The third VNIC enables access from the first application to a fourth application executing outside the customer domain. The third VNIC is configured to use an addressing specification used by a server of the fourth application.

20 Claims, 6 Drawing Sheets

(56) References Cited

U.S. PATENT DOCUMENTS

2011/0283017 A1 11/2011 Alkhatib et al.
2012/0254445 A1 10/2012 Kawamoto et al.

OTHER PUBLICATIONS

Notification of Transmittal of the International Search Report and the Written Opinion of the International Searching Authority, or the Declaration; PCT/JP2014/003042, Sep. 22, 2014.

Written Opinion of the International Searching Authority; PCT/JP2014/003042, Sep. 22, 2014.
Demchenko, Y. et al.; Security Infrastructure for On-demand Provisioned Cloud Infrastructure Services; 2011.
Membrey, P. etl al., Trusted virtual infrastructure bootstrapping for on demand services, 2012.
Juniper Networks, Securing Multi-Tenancy and Cloud Computing, 2012.
Himura, Y. et al., Discovering Configuration Templates of Virtualized Tenant Networks in Multi-tenancy Datacenters via Graph-mining, Jul. 2012.

* cited by examiner

PROVISIONING A SECURE CUSTOMER DOMAIN IN A VIRTUALIZED MULTI-TENANT ENVIRONMENT

TECHNICAL FIELD

The present invention relates generally to a method, system, and computer program product for managing a multi-tenant data processing environment. More particularly, the present invention relates to a method, system, and computer program product for provisioning a secure customer domain in a virtualized multi-tenant environment.

BACKGROUND

Certain data processing systems are configured to process several workloads simultaneously. For example, separate virtual data processing systems, such as separate virtual machines (VMs), configured on a single host data processing system often process separate workloads for different customers or applications.

In large scale data processing environments, such as in a data center, thousands of VMs can be operating on a host at any given time, and hundreds if not thousands of such hosts may be operational in the data center at the time. A virtualized data processing environment, such as the described data center, is often referred to as a "cloud" that provides computing resources and computing services to several customers on an as-needed basis.

VMs are installed or created on a compute node as needed for processing customer workloads, meeting service level requirements, and many other reasons. Furthermore, different configurations of VMs may be needed for different purposes. For example, when a VM is created just for providing a user a general purpose computing platform, the VM may be created only with the basic operating system and no applications. In another example, when a new VM has to provide application services, the VM may be created with an operating system and an application server configured thereon.

Similarly, many different configurations of VMs may be preconfigured as template images (templates). When a VM having a specific predetermined configuration has to be created on a compute node, a suitable template is selected from a template storage, such as a database or a file-system, and installed on the compute node to create a VM having the desired configuration.

SUMMARY

The illustrative embodiments provide a method, system, and computer program product for provisioning a secure customer domain in a virtualized multi-tenant environment. An embodiment configures, by using a processor, a virtual machine (VM) for a customer in the customer domain. The embodiment configures, by using the processor, a first virtual network interface (VNIC) in the VM, wherein the first VNIC enables an application on the VM to access a second application in a second VM in the customer domain. The embodiment assigns, by using the processor, a first network address to the first VNIC, wherein the first network address is within a first address range selected for the customer domain. The embodiment configures, by using the processor, a second VNIC in the VM, wherein the second VNIC enables a third application outside the customer domain to access the VM in the customer domain, and wherein the second VNIC is configured to use an addressing specification used by a server of the third application. The embodiment configures, by using the processor, a third VNIC in the VM, wherein the third VNIC enables access from the first application to a fourth application executing outside the customer domain, and wherein the third VNIC is configured to use an addressing specification used by a server of the fourth application, thereby securing data communication relating to the customer domain from interference from data communication relating to a second customer domain.

Another embodiment includes one or more computer-readable tangible storage devices. The embodiment further includes program instructions, stored on at least one of the one or more storage devices, to configure a virtual machine (VM) for a customer in the customer domain. The embodiment further includes program instructions, stored on at least one of the one or more storage devices, to configure a first virtual network interface (VNIC) in the VM, wherein the first VNIC enables an application on the VM to access a second application in a second VM in the customer domain. The embodiment further includes program instructions, stored on at least one of the one or more storage devices, to assign a first network address to the first VNIC, wherein the first network address is within a first address range selected for the customer domain. The embodiment further includes program instructions, stored on at least one of the one or more storage devices, to configure a second VNIC in the VM, wherein the second VNIC enables a third application outside the customer domain to access the VM in the customer domain, and wherein the second VNIC is configured to use an addressing specification used by a server of the third application. The embodiment further includes program instructions, stored on at least one of the one or more storage devices, to configure a third VNIC in the VM, wherein the third VNIC enables access from the first application to a fourth application executing outside the customer domain, and wherein the third VNIC is configured to use an addressing specification used by a server of the fourth application, thereby securing data communication relating to the customer domain from interference from data communication relating to a second customer domain.

Another embodiment includes one or more processors, one or more computer-readable memories and one or more computer-readable tangible storage devices. The embodiment further includes program instructions, stored on at least one of the one or more storage devices for execution by at least one of the one or more processors via at least one of the one or more memories, to configure a virtual machine (VM) for a customer in the customer domain. The embodiment further includes program instructions, stored on at least one of the one or more storage devices for execution by at least one of the one or more processors via at least one of the one or more memories, to configure a first virtual network interface (VNIC) in the VM, wherein the first VNIC enables an application on the VM to access a second application in a second VM in the customer domain. The embodiment further includes program instructions, stored on at least one of the one or more storage devices for execution by at least one of the one or more processors via at least one of the one or more memories, to assign a first network address to the first VNIC, wherein the first network address is within a first address range selected for the customer domain. The embodiment further includes program instructions, stored on at least one of the one or more storage devices for execution by at least one of the one or more processors via at least one of the one or more memories, to configure a second VNIC in the VM, wherein the second VNIC enables a third application outside the customer domain to access the VM in the customer domain, and wherein the second VNIC is configured to use an addressing specification used by a server of the third application. The embodiment further includes program instructions, stored on at least one of the one or more storage devices for execution by at least one of the one or more processors via at least one of the one or more memories, to configure a third VNIC in the VM, wherein the third VNIC enables access from the first application to a fourth application executing outside the customer domain, and wherein the third VNIC is configured to use an addressing specification used by a server of the fourth application, thereby securing data communication relating to the customer domain from interference from data communication relating to a second customer domain.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

A multi-tenant data processing environment (multi-tenant environment) is a data processing environment where more than one customer's data processing systems are hosted. A virtualized multi-tenant data processing environment (virtualized environment, virtualized multi-tenant environment, VME, cloud) is a multi-tenant environment where virtual machines are configured to perform computing tasks for several customers.

The illustrative embodiments recognize that a customer in a VME is typically configured with different VMs for different purposes. For example, a customer may have one VM configured to provide web services, another to provide back-end application support, and another to host a database. Any number of VMs can be similarly configured for specialized purposes, mixed use, or general purpose computing.

The illustrative embodiments further recognize that generally, customers are in control of configuring their applications in a VME. For example, other than some basic requirements of the VME where the customer is hosted, a customer can chose any Internet Protocol (IP) address range to facilitate communication amongst customer's various applications executing on one or more VMs. Some examples of the basic requirements of a VME are that the customer's VMs should be reachable for administration purposes, and that the customer's addressing should not conflict with the addressing used in the shared services available within the VME.

The illustrative embodiments further recognize that customers expect their set of VMs and applications (customer domain) to be secure from other customers' domains. In other words, communication to or from one customer's domain should not interfere with communications to or from another customer's domain unless intended.

The illustrative embodiments recognize that securing a customer domain in a VME is a difficult problem. One example reason for the difficulty is that an address range chosen by one customer may inadvertently overlap with an address range chosen by another customer in the VME.

The illustrative embodiments recognize that enforcing a strict address-range separation policy is impractical, difficult, and expensive. For example, the code of a customer application may need to be modified to enforce such a policy, and may be unacceptable to the customer. As another example, enforcing such a policy in the presently available VME infrastructure requires configuration or re-configuration of one or more existing customer domains to implement a new customer or for changing a customer's domain.

The illustrative embodiments further recognize that in the presently available VME infrastructure, hardware devices have to be used for isolating the customer domains from the servers serving administration applications and shared tools. Consequently, hardware elements have to added, removed, or changed as customer domains in the VME change. Such hardware changes are expensive, and still require strict address-range separation policy-type solutions to address the problem of overlapping customer domain address ranges.

The illustrative embodiments used to describe the invention generally address and solve the above-described problems and other problems related to multi-tenant environments. The illustrative embodiments provide a method, system, and computer program product for provisioning a secure customer domain in a virtualized multi-tenant environment.

The illustrative embodiments provide a manner of configuring components in a customer domain such that the customer domain remains secure from interferences from other customer domains in the VME even if the customer domain uses an address range that overlaps with another customer domain in the VME. The illustrative embodiments further provide a technique for ensuring separation between the customer domain and the administrative and shared tools such that hardware elements are not required to be configured for the separation. The techniques, procedures, and manners of operations described herein can be implemented in a template for a VM such that when a VM is constructed in a customer domain, the VM is configured in the manner described in this disclosure without requiring hardware changes in the multi-tenant environment.

The illustrative embodiments are described with respect to certain data processing systems, environments, components, and applications only as examples. Any specific manifestations of such artifacts are not intended to be limiting to the invention. Any suitable manifestation of data processing systems, environments, components, and applications can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
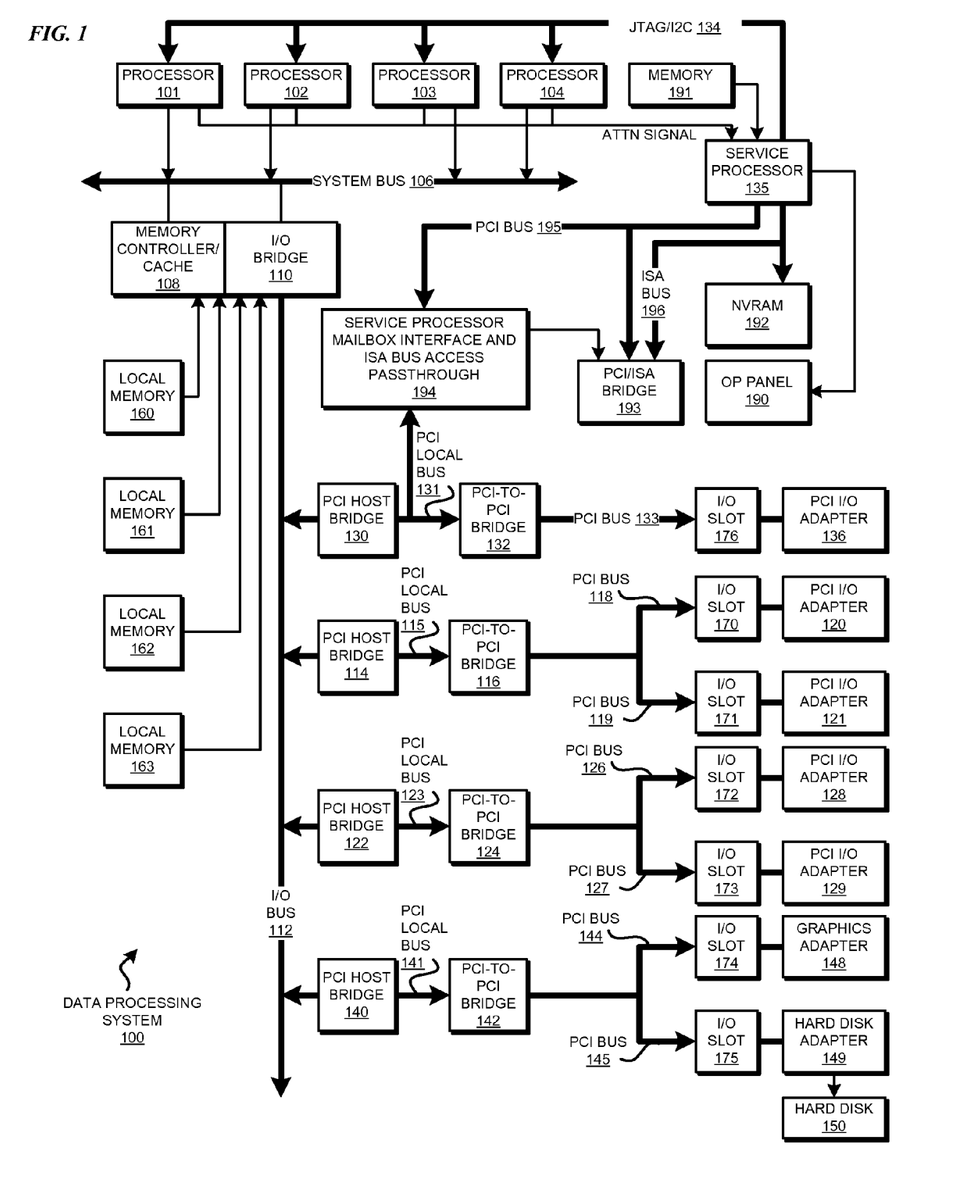
FIG. 1 depicts a block diagram of a data processing system in which the illustrative embodiments may be implemented.
Figure 2:
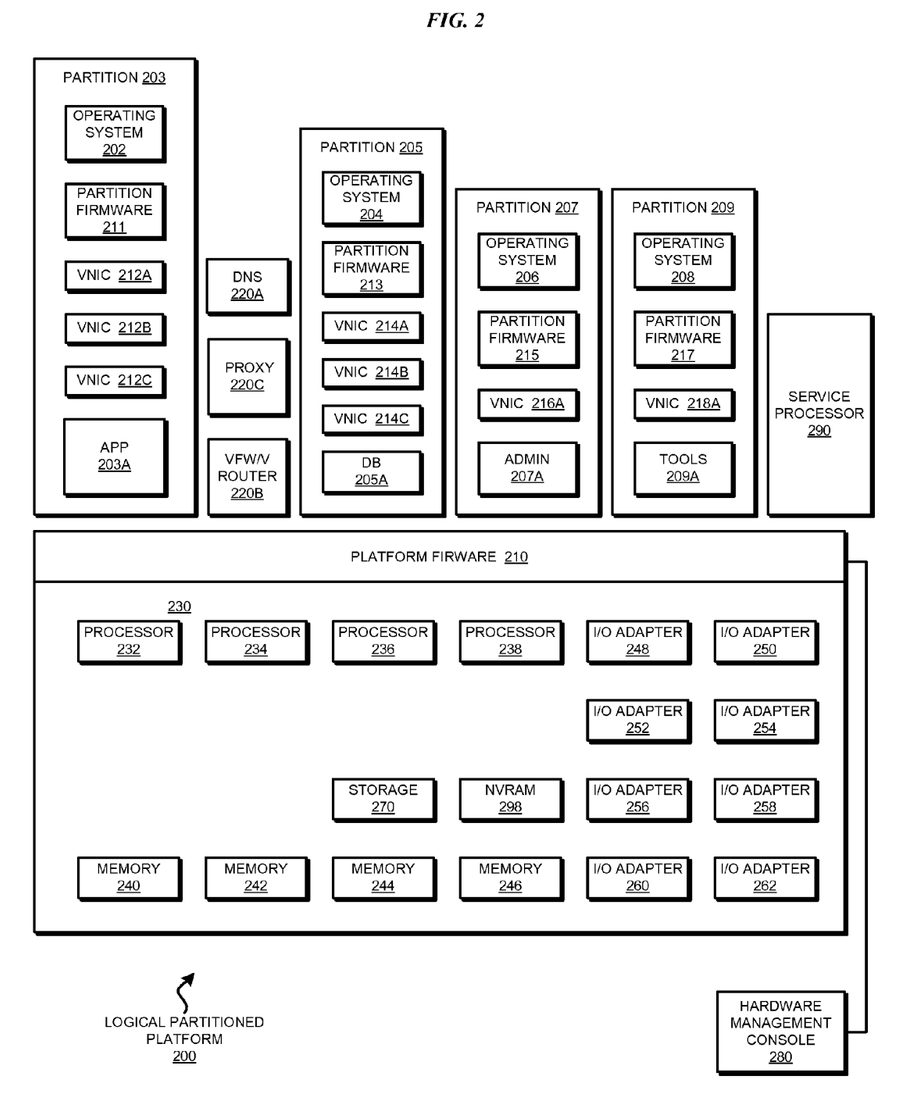
FIG. 2 depicts a block diagram of an example logically partitioned platform in which the illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

With reference to FIG. 1, this figure depicts a block diagram of a data processing system in which the illustrative embodiments may be implemented. Data processing system 100 may be a symmetric multiprocessor (SMP) system including a plurality of processors 101, 102, 103, and 104, which connect to system bus 106. For example, data processing system 100 may be an IBM Power System® implemented as a server within a network. (Power Systems is a product and a trademark of International Business Machines Corporation in the United States and other countries). Alternatively, a single processor system may be employed and processors 101, 102, 103, and 104 may be cores in the single processor chip. Alternatively, data processing system 100 may include processors 101, 102, 103, 104 in any combination of processors and cores.

Also connected to system bus 106 is memory controller/cache 108, which provides an interface to a plurality of local memories 160-163. I/O bus bridge 110 connects to system bus 106 and provides an interface to I/O bus 112. Memory controller/cache 108 and I/O bus bridge 110 may be integrated as depicted.

Data processing system 100 is a logically partitioned data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120-121, 128-129, and 136, graphics adapter 148, and hard disk adapter 149 may be assigned to different logical partitions. In this case, graphics adapter 148 connects to a display device (not shown), while hard disk adapter 149 connects to and controls hard disk 150.

Thus, for example, suppose data processing system 100 is divided into three logical partitions, P1, P2, and P3. Each of PCI I/O adapters 120-121, 128-129, 136, graphics adapter 148, hard disk adapter 149, each of host processors 101-104, and memory from local memories 160-163 is assigned to one of the three partitions. In these examples, memories 160-163 may take the form of dual in-line memory modules (DIMMs). DIMMs are not normally assigned on a per DIMM basis to partitions. Instead, a partition will get a portion of the overall memory seen by the platform. For example, processor 101, some portion of memory from local memories 160-163, and I/O adapters 120, 128, and 129 may be assigned to logical partition P1; processors 102-103, some portion of memory from local memories 160-163, and PCI I/O adapters 121 and 136 may be assigned to partition P2; and processor 104, some portion of memory from local memories 160-163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX®) operating system may be executing within partition P1, a second instance (image) of the AIX operating system may be executing within partition P2, and a Linux® or IBM-i® operating system may be operating within logical partition P3. (AIX and IBM-i are trademarks of International business Machines Corporation in the United States and other countries. Linux is a trademark of Linus Torvalds in the United States and other countries).

Peripheral component interconnect (PCI) host bridge 114 connected to I/O bus 112 provides an interface to PCI local bus 115. A number of PCI input/output adapters 120-121 connect to PCI local bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations support between four and eight I/O adapters (i.e. expansion slots for add-in connectors). Each PCI I/O adapter 120-121 provides an interface between data processing system 100 and input/output devices such as, for example, other network computers, which are clients to data processing system 100.

An additional PCI host bridge 122 provides an interface for an additional PCI local bus 123. PCI local bus 123 connects to a plurality of PCI I/O adapters 128-129. PCI I/O adapters 128-129 connect to PCI local bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128-129. Consequently, data processing system 100 allows connections to multiple network computers.

Memory mapped graphics adapter 148 is inserted into I/O slot 174 and connects to I/O bus 112 through PCI bus 144, PCI-to-PCI bridge 142, PCI local bus 141, and PCI host bridge 140. Hard disk adapter 149 may be placed into I/O slot 175, which connects to PCI bus 145. In turn, PCI bus 145 connects to PCI-to-PCI bridge 142, which connects to PCI host bridge 140 by PCI local bus 141.

A PCI host bridge 130 provides an interface for a PCI local bus 131 to connect to I/O bus 112. PCI I/O adapter 136 connects to I/O slot 176, which connects to PCI-to-PCI bridge 132 by PCI bus 133. PCI-to-PCI bridge 132 connects to PCI local bus 131. PCI local bus 131 also connects PCI host bridge 130 to service processor mailbox interface and ISA bus access pass-through logic 194 and PCI-to-PCI bridge 132.

Service processor mailbox interface and ISA bus access pass-through logic 194 forwards PCI accesses destined to PCI/ISA bridge 193. NVRAM storage 192 connects to ISA bus 196. Service processor 135 connects to service processor mailbox interface and ISA bus access pass-through logic 194 through its local PCI bus 195. Service processor 135 also connects to processors 101-104 via a plurality of JTAG/I2C busses 134. JTAG/I2C busses 134 are a combination of JTAG/scan busses (see IEEE 1149.1) and Phillips I2C busses.

However, alternatively, JTAG/I2C busses 134 may be replaced by only Phillips I2C busses or only JTAG/scan busses. All SP-ATTN signals of the host processors 101, 102, 103, and 104 connect together to an interrupt input signal of service processor 135. Service processor 135 has its own local memory 191 and has access to hardware OP-panel 190.

When data processing system 100 is initially powered up, service processor 135 uses the JTAG/I2C busses 134 to interrogate the system (host) processors 101-104, memory controller/cache 108, and I/O bridge 110. At the completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101-104, memory controller/cache 108, and I/O bridge 110. Service processor 135 gathers and reports any error information for failures detected during the BISTs, BATs, and memory tests.

If a meaningful/valid configuration of system resources is still possible after taking out the elements found to be faulty during the BISTs, BATs, and memory tests, then data processing system 100 is allowed to proceed to load executable code into local (host) memories 160-163. Service processor 135 then releases host processors 101-104 for execution of the code loaded into local memory 160-163. While host processors 101-104 are executing code from respective operating systems within data processing system 100, service processor 135 enters a mode of monitoring and reporting errors. Service processor 135 monitors types of items including, for example, the cooling fan speed and operation, thermal sensors, power supply regulators, and recoverable and non-recoverable errors reported by processors 101-104, local memories 160-163, and I/O bridge 110.

Service processor 135 saves and reports error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap."

Data processing system 100 may be implemented using various commercially available computer systems. For example, data processing system 100 may be implemented using IBM Power Systems available from International Business Machines Corporation. Such a system may support logical partitioning using an AIX operating system, which is also available from International Business Machines Corporation.

Memories, such as memory 191, NVRAM 192, local memories 160, 161, 162, and 163, or flash memory (not shown), are some examples of computer usable storage devices. Hard disk 150, a CD-ROM (not shown), and other similarly usable devices are some examples of computer usable storage devices including computer usable storage medium.

Those of ordinary skill in the art will appreciate that the hardware depicted in FIG. 1 may vary. For example, other peripheral devices, such as optical disk drives and the like, also may be used in addition to or in place of the hardware depicted. As another example, some physical resources, such as adapters, can be virtualized into corresponding virtual resources (not shown), and the virtual resources can then be allocated to the various partitions. As another example, the hardware depicted in FIG. 1 can be configured to use one or more virtual I/O server (VIOS) (not shown). The VIOS allows the sharing of physical resources, such as adapters, disks, controllers, processors, memories, and the like, between the supported logical partitions. Among other functions, between partitions, a shared VIOS helps reduce the need for large amounts of cabling, and perform live migration. The depicted example is not meant to imply architectural limitations with respect to the illustrative embodiments.

With reference to FIG. 2, this figure depicts a block diagram of an example logically partitioned platform in which the illustrative embodiments may be implemented. The hardware in logically partitioned platform 200 may be implemented as, for example, the corresponding components depicted in data processing system 100 in FIG. 1.

Logically partitioned platform 200 includes partitioned hardware 230, operating systems 202, 204, 206, 208, and platform firmware 210. A platform firmware, such as platform firmware 210, is also known as partition management firmware. Operating systems 202, 204, 206, and 208 may be multiple copies of a single operating system or multiple heterogeneous operating systems simultaneously run on logically partitioned platform 200. These operating systems may be implemented using IBM-i, which is designed to interface with a partition management firmware, such as Hypervisor. IBM-i is used only as an example in these illustrative embodiments. Of course, other types of operating systems, such as AIX and Linux, may be used depending on the particular implementation. Operating systems 202, 204, 206, and 208 are located in partitions 203, 205, 207, and 209, respectively.

Hypervisor software is an example of software that may be used to implement partition management firmware 210 and is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM).

Additionally, partitions 203, 205, 207, and 209 also include partition firmware 211, 213, 215, and 217, respectively. Partition firmware 211, 213, 215, and 217 may be implemented using initial boot strap code, IEEE-1275 Standard Open Firmware, and runtime abstraction software (RTAS), which is available from International Business Machines Corporation. When partitions 203, 205, 207, and 209 are instantiated, platform firmware 210 loads a copy of boot strap code onto partitions 203, 205, 207, and 209. Thereafter, control is transferred to the boot strap code with the boot strap code then loading the open firmware and RTAS. The processors associated or assigned to the partitions are then dispatched to the partition's memory to execute the partition firmware.

Partition 203 is an example VM configured to operate in a customer domain and serve example application 203A. Partition 203 is configured with at least three virtual network interface cards (VNICs) 212A, 212B, and 212C. Partition 205 is another example VM configured to operate in a customer domain and serve example database application 205A. Each of partitions 203 and 205 is configured with at least three virtual network interface cards (VNICs). Partition 203 includes VNICs 212A, 212B, and 212C, and partition 205 includes VNICs 214A, 214B, and 214C. As an example, each of VNICs 212A, 212B, 212C, 214A, 214B, 214C is a virtualized resource that maps to a combination of physical I/O adapters 248, 250, 252, 254, 256, 258, 260, and 262 in any suitable manner.

Partition 207 is an example VM configured to serve example administration services 207A. Administration services 207A are usable for administration of partitions 203 and 205 in the customer domain. Administration services 207A use VNIC 216A for accessing partitions 203 and 205 in the customer domain for this purpose. VNIC 216A is a virtualized resource that maps to any of physical I/O adapters 248, 250, 252, 254, 256, 258, 260, and 262 in any suitable manner. In one embodiment, a VNIC, such as VNIC 216A, maps to a virtual resource in a VIOS instance, which is then connected to one or more of these physical adapters. For example, in such an implementation, the VIOS instance ensures redundancy through a shared Ethernet adapter across two VIOS. In one embodiment, administration services 207A are configured on a host (not shown) that is distinct from logical partition platform 200, are accessible from the customer domain over a data network, and VNIC 216A maps to a different physical I/O adapter in that distinct host. In one embodiment, the customer domain includes partitions or VMs in other host systems (not shown) that are distinct from logical partition platform 200, and are accessible from partitions 203 and 205 over a data network.

Partition 209 is an example VM configured to serve example shared tools 209A. Shared tools 209A are reached in partition 209, by partitions 203 and 205 in the customer domain, over a data network via VNIC 218A. VNIC 218A is a virtualized resource that maps to any of physical I/O adapters 248, 250, 252, 254, 256, 258, 260, and 262 in any suitable manner. In one embodiment, shared tools 209A are configured on a host (not shown) that is distinct from logical partition platform 200, are accessible from the customer domain over a data network, and VNIC 218A maps to a different physical I/O adapter in that distinct host.

Domain name service (DNS) 220A is one or more customized views of a DNS service executing in the VME where logical partition platform 200 is operating. Customized views of DNS 220A exposes only the routes to those administrative services 207A and shared tools 209A that are authorized for the customer domain that includes partitions 203 and 205.

Virtual firewall and router (VFW/router) 220B is a virtualized routing resource in the VME. VFW/router 220B is instantiated in the customer domain to facilitate communication amongst servers, applications, and VMs in the customer domain. More than one instance similar to 220B can be created in the customer domain within the scope of the illustrative embodiments.

Proxy 220C, alone or in conjunction with a combination of VFW/router 220B and DNS 220A, facilitates communication between the components in the customer domain and administrative services 207A and shared tools 209A, without confusion or interference from another customer domain, which may be using an address range that overlaps with the address range used in the customer domain. Proxy 220C can be a reverse proxy, a bidirectional proxy, or another suitable manifestation of a proxy server. Additionally proxy 220C can be a transformation device, such as NAT, or a tool capable of performing policy-based routing to destination shared tools. The policy-based routing allows overlapping ranges to be routed differently based on the source router/firewall, and therefore can be routed to a dedicated (VM) shared tool which was set up to either solve the overlapping address ranges issue or to make an application (tool), which does not support multi-tenancy, multi-tenant capable, such as through instantiation.

Partitioned hardware 230 includes a plurality of processors 232-238, a plurality of system memory units 240-246, a plurality of input/output (I/O) adapters 248-262, and a storage unit 270. Each of the processors 232-238, memory units 240-246, NVRAM storage 298, and I/O adapters 248-262 may be assigned to one of partitions 203, 205, 207, and 209 within logically partitioned platform 200, each of which partitions 203, 205, 207, and 209 corresponds to one of operating systems 202, 204, 206, and 208.

Partition management firmware 210 performs a number of functions and services for partitions 203, 205, 207, and 209 to create and enforce the partitioning of logically partitioned platform 200. Partition management firmware 210 is a firmware implemented virtual machine identical to the underlying hardware. Thus, partition management firmware 210 allows the simultaneous execution of independent OS images 202, 204, 206, and 208 by virtualizing all the hardware resources of logically partitioned platform 200.

Service processor 290 may be used to provide various services, such as processing of platform errors in the partitions. These services also may act as a service agent to report errors back to a vendor, such as International Business Machines Corporation. Operations of partitions 203, 205, 207, and 209 may be controlled through a hardware management console, such as hardware management console 280. Hardware management console 280 is a separate data processing system from which a system administrator may perform various functions including reallocation of resources to different partitions.

The hardware in FIGS. 1-2 may vary depending on the implementation. Other internal hardware or peripheral devices, such as flash memory, equivalent non-volatile memory, or optical disk drives and the like, may be used in addition to or in place of certain hardware depicted in FIGS. 1-2. An implementation of the illustrative embodiments may also use alternative architecture for managing partitions without departing from the scope of the invention.

Figure 3:
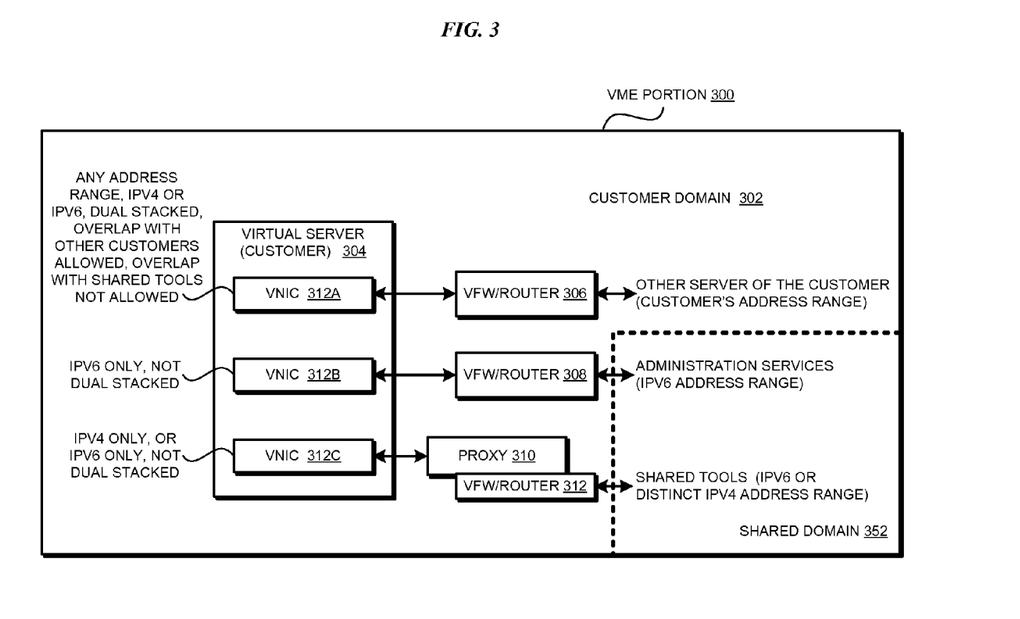
FIG. 3 depicts a block diagram of a configuration for provisioning a secure customer domain in a virtualized multi-tenant environment in accordance with an illustrative embodiment.

With reference to FIG. 3, this figure depicts a block diagram of a configuration for provisioning a secure customer domain in a virtualized multi-tenant environment in accordance with an illustrative embodiment. VME portion 300 is a part of a VME where multiple customer domains are configured. Customer domain 302 is one example customer domain in VME portion 300. Virtual server 304 is one example machine configured in example customer domain 302. Virtual server 304 can be implemented using partition 203 in FIG. 2. VNICs 312A, 312B, and 312C are embodiments of VNICs 212A, 212B, and 212C, respectively.

In one embodiment, VNIC 312A operates to facilitate communications between the various servers operating in customer domain 302. VNIC 312A communicates with VFW/router 306 to reach one or more servers, components, or applications in customer domain 302.

VNIC 312A is configured to use an address from an address range of the customer's choosing. The chosen address range, and consequently the address assigned to VNIC 312A, can use IPv4 addressing or IPv6 addressing according to the customer's preference.

Customers are not allowed to use an address range that is reserved for machines, servers, systems, adapters, components, or applications operating in shared domain 352. While address ranges that overlap between two or more customer domains is unlikely when using IPv6, a distinct possibility of such overlap exists when selecting IPv4 rages. Overlap in IPv4 addressing becomes more likely as less and less free unique IPv4 addresses remain available, and because large portions of IPv4 address space are reused and are not available as unique. For example, IPv4 class A address space with approximately 16 million addresses is the largest block of IPv4 addresses available. it is not possible to assign more than approximately 16.7 million IPv4 addresses without re-use or overlap due to limited and disjoint IPv4 address space. As an example, DSL providers or mobile telephony and data services providers may have more customers than IPv4 in a single class A address space, requiring more than one class A address spaces. With only 125 total class A address spaces available, and only one class A address space allowed for private non-Internet routed use, IPv4 does not scale well with the increasing demand for addresses.

In one embodiment, VNIC 312A is dual stacked, to wit, configured to use both IPv4 TCP/IP stack as well as IPv6 TCP/IP stack. Advantageously, the dual stacked configuration permits the customer to select any addressing specification, migrate from one addressing specification to another, or use a combination of addressing specifications within their domain, without requiring hardware addition or changes in the VME in support.

In one embodiment, VNIC 312B operates to facilitate communications between virtual server 304 and servers providing administration services, such as shared storage/backup/install/recovery services. VNIC 312B communicates with VFW/router 308 to reach one or more administration services. Among other reasons, an embodiment uses the second VNIC 312B to keep heavy storage traffic separate from other data traffic, such as to allow the use of jumbo frames, which require extensive routing path support.

VNIC 312B is configured to use an IPv6 address that is assigned uniquely to the customer. In one embodiment, VNIC 312A is configured to use only IPv6 TCP/IP stack. Administration services are reachable in the VME only via IPv6 addresses uniquely assigned for use in shared domain 352. IPv6 uses a 128-bit address, allowing $2^{128}$, or approximately $3.4 \times 10^{38}$ addresses, or more than $7.9 \times 10^{28}$ times as many as IPv4, which uses 32-bit addresses. Because IPv6 address space is extremely large as compared to IPv4 address space, and because the same IPv6 address is not assigned to different entities, accidental overlap of addresses is highly unlikely if not impossible.

In one embodiment, VNIC 312C operates to facilitate communications between virtual server 304 and servers providing shared tools. VNIC 312C communicates with proxy 310 and VFW/router 312 to access one or more shared tools. Proxy 310 allows for reliable communications between applications in customer domain 302 and applications in shared domain 352 in case of overlap between the address ranges in use at customer domain 302 and another customer domain.

VNIC 312C is configured to use either an IPv4 address of customer's choosing, an IPv6 address that is assigned uniquely to the customer (or assigned uniquely to the hosting provider, who then allocates it to the customer), but not both. Accordingly, VNIC 312C is configured to use only either IPv4 TCP/IP stack, or IPv6 TCP/IP stack, respectively, but not both.

The choice of IPv4 addressing or IPv6 addressing in VNIC 312C depends upon the addressing used in shared domain 352 for the shared tools due to the interoperability limitation between IPv4 addressing and IPv6 addressing. If the shared tools are reachable using IPv4 addresses reserved for shared domain 352, then VNIC 312C is configured with an IPv4 address. If the shared tools are reachable using IPv6 addresses, then VNIC 312C is configured with an IPv6 address.

Generally, all or any combination of the virtual components shown in this figure can be specified in a template for a VM for a customer. When a customer is to be newly provisioned, re-provisioned, or the customer environment has to change, creation and configuration of the virtual components as described maintains the security of the customer's domain, without concern for overlapping customer address ranges, and without requiring any hardware modifications in the VME.

Figure 4:
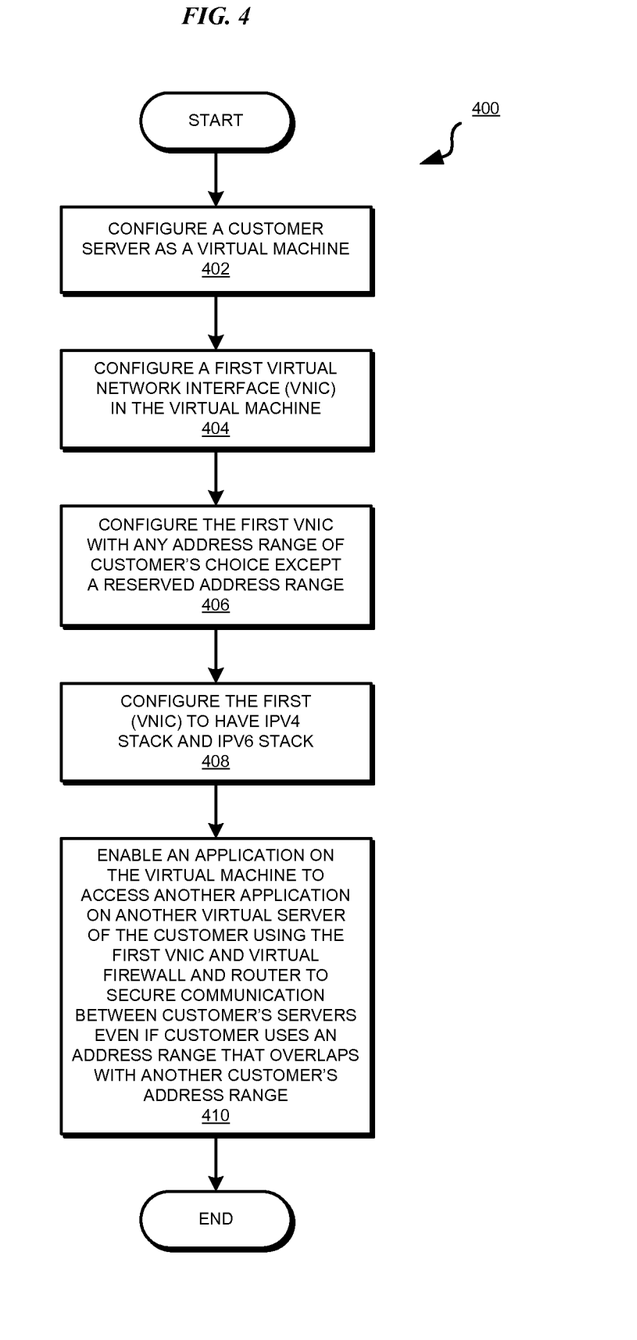
FIG. 4 depicts a flowchart of an example process for provisioning a secure customer domain in a virtualized multi-tenant environment in accordance with an illustrative embodiment.

With reference to FIG. 4, this figure depicts a flowchart of an example process for provisioning a secure customer domain in a virtualized multi-tenant environment in accordance with an illustrative embodiment. Process 400 can be implemented in an administration service, such as one of administration services 207A in FIG. 2.

An administration service begins process 400 by configuring a customer server as a VM (block 402). More than one customer servers may occupy a tier in a customer's domain. For example, web services may form one tier, database services may form another tier, and applications may form a third tier. Any number of tiers are similarly possible within the scope of the illustrative embodiments. The administration service creates three virtual local area networks (VLANs) for each customer server tier. Process 400 is described with respect to one example tier only for the clarity of the description and without implying a limitation on the illustrative embodiments.

Accordingly, the administration service configures a first VNIC in the VM (block 404). The administration service configures the first VNIC with an address from any address range of the customer's choice excepting a reserved address range (block 406). The administration service configures the first VNIC with an IPv4 TCP/IP stack and an IPv6 TCP/IP stack (block 408).

The administration service enables an application on the VM to access another application on another virtual server of the customer using the first VNIC and a VFW/router to secure the communication between customer's servers even if the customer uses an address range that overlaps with another customer's address range (block 410). The administration service either ends process 400 or exits process 400 at exit point marked "A" to enter another process, such as process 500 in FIG. 5 at a corresponding entry point marked "A" therein.

Figure 5:
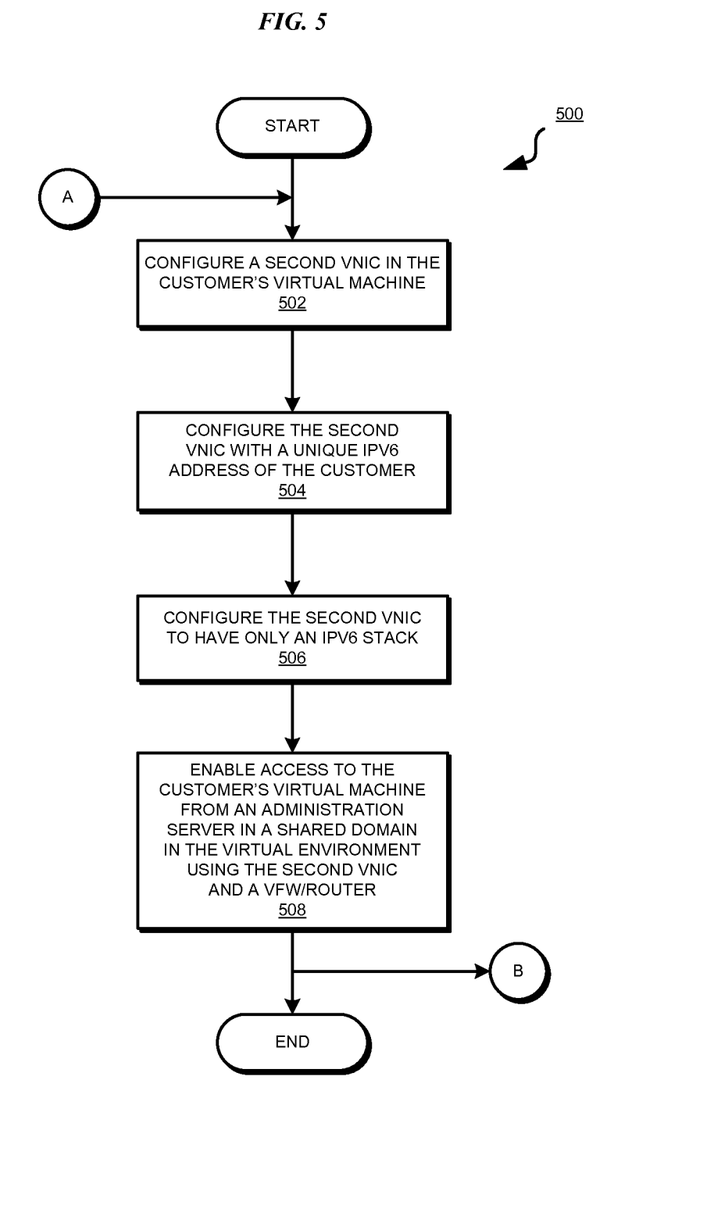
FIG. 5 depicts a flowchart of another example process for provisioning a secure customer domain in a virtualized multi-tenant environment in accordance with an illustrative embodiment.

With reference to FIG. 5, this figure depicts a flowchart of another example process for provisioning a secure customer domain in a virtualized multi-tenant environment in accordance with an illustrative embodiment. Process 500 can be implemented in an administration service, such as one of administration services 207A in FIG. 2.

An administration service begins process 500, or enters process 500 at entry point marked "A", by configuring a second VNIC in the customer's VM, such as in the VM configured in block 402 in FIG. 4 (block 502). The administration service configures the second VNIC with a unique IPv6 address of the customer (block 504). The administration service configures the second VNIC with an IPv6 TCP/IP stack (block 506).

The administration service enables access to the customer's VM from an administration server in a shared domain in the VME using the second VNIC and a VFW/router (block 508). The administration service either ends process 500 or exits process 500 at exit point marked "B" to enter another process, such as process 600 in FIG. 6 at a corresponding entry point marked "B" therein.

Figure 6:
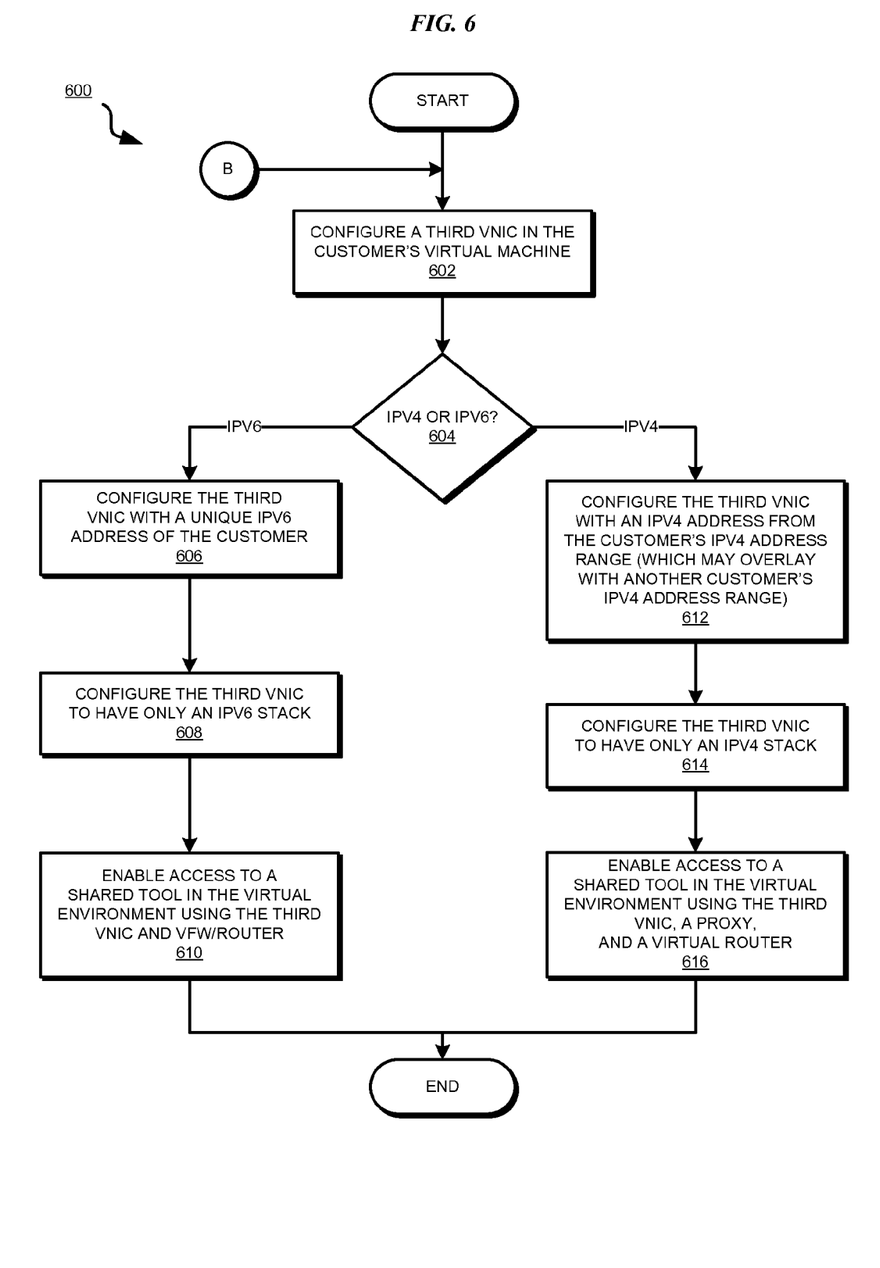
FIG. 6 depicts a flowchart of another example process for provisioning a secure customer domain in a virtualized multi-tenant environment in accordance with an illustrative embodiment.

With reference to FIG. 6, this figure depicts a flowchart of another example process for provisioning a secure customer domain in a virtualized multi-tenant environment in accordance with an illustrative embodiment. Process 600 can be implemented in an administration service, such as one of administration services 207A in FIG. 2.

An administration service begins process 600, or enters process 600 at entry point marked "B", by configuring a third VNIC in the customer's VM, such as in the VM configured in block 402 in FIG. 4 (block 602). The administration service determines whether IPv4 or IPv6 addressing specification is to be used in configuring the third VNIC (block 604).

If IPv6 addressing is to be used for the third VNIC ("IPv6" path of block 604), the administration service configures the third VNIC with a unique IPv6 address of the customer (block 606). The administration service configures the third VNIC with an IPv6 TCP/IP stack (block 608).

The administration service enables access to a shared tool in the VME from the customer's VM using the third VNIC and a VFW/router (block 610). The administration service ends process 500 thereafter.

If IPv4 addressing is to be used for the third VNIC ("IPv4" path of block 604), the administration service configures the third VNIC with an IPv4 address from the customer's chosen IPv4 address range, which may overlap with another customer's address range but cannot overlap with a reserved address range (block 612). The administration service configures the third VNIC with an IPv4 TCP/IP stack (block 614).

The administration service enables access to a shared tool in the VME from the customer's VM using the third VNIC, a proxy, and a VFW/router (block 616). The administration service ends process 500 thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a computer implemented method, system, and computer program product are provided in the illustrative embodiments for provisioning a secure customer domain in a virtualized multi-tenant environment. An embodiment provisions a new customer, re-provisions an existing customer, or changes a customer's provisioning in a VME such that the customer domain is secured with respect to communications inside and outside the customer's domain. An embodiment affords the security or isolation from other customer domains without concerns about the address ranges used by other customers in the VME. An embodiment uses virtualized components for provisioning the secure customer domain elements. As a result, the provisioning and security of a customer domain can be automated to a greater extent that presently possible. Furthermore, any changes in the customer domain, in the administration services, or in shared tools of the VME can also be accommodated without addition or modification of hardware.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable signal medium or a computer readable storage medium. A computer readable storage device may be an electronic, magnetic, optical, electromagnetic, or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible device that can store a program for use by or in connection with an instruction execution system, apparatus, or device. The terms "computer-readable tangible storage devices," "computer readable storage device," and "storage device" do not encompass a signal propagation medium, any description in this disclosure to the contrary notwithstanding.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable media that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for securing a customer domain in a virtualized multi-tenant environment, the method comprising:
    configuring, by a processor, a virtual machine (VM) for a customer in the customer domain;
    configuring, by the processor, a first virtual network interface (VNIC) in the VM, wherein the first VNIC enables a first application on the VM to access a second application in a second VM in the customer domain;
    assigning, by the processor, a first network address to the first VNIC, wherein the first network address is within a first network address range selected for the customer domain;
    configuring, by the processor, a second VNIC in the VM, wherein the second VNIC enables a third application outside the customer domain to access the VM in the customer domain, and wherein the second VNIC is configured to use an addressing specification used by a server of the third application; and
    configuring, by the processor, a third VNIC in the VM, wherein the third VNIC enables access from the first application to a fourth application executing outside the customer domain, and wherein the third VNIC is configured to use an addressing specification used by a server of the fourth application, thereby securing data communication relating to the customer domain from interference from data communication relating to a second customer domain.

2. The method of claim 1, wherein the first network address range overlaps with a second network address range selected for the second customer domain.

3. The method of claim 1, wherein the first address comprises an IPv4 address, and wherein the access to the second application is facilitated via a first virtual router instantiated within the customer domain.

4. The method of claim 1, wherein the VM occupies a tier in the customer domain, and wherein the tier comprises at least three virtual local area networks, further comprising:
    assigning, by the processor, a second network address to the second VNIC, wherein the second network address comprises an IPv6 address, and wherein the access from the third application is facilitated via a second virtual router instantiated within the customer domain.

5. The method of claim 4, wherein the access from the third application is further facilitated via a first instance of a domain name service created for the customer domain, wherein the first instance of the DNS includes routing authorized for administration of the customer domain.

6. The method of claim 1, further comprising:
    assigning, by the processor, a third network address to the third VNIC, wherein the third network address comprises an IPv6 address, and wherein the access to the fourth application is facilitated via a third virtual router instantiated within the customer domain.

7. The method of claim 1, further comprising:
    assigning, by the processor, a third network address to the third VNIC, wherein the third network address is within the first network address range selected for the customer domain, and wherein the first network address range overlaps with a second network address range selected for a second customer domain, and wherein the access to the fourth application is facilitated via a third virtual router instantiated within the customer domain.

8. The method of claim 7, wherein the access to the fourth application is further facilitated via a second instance of a domain name service created for the customer domain, wherein the second instance of the DNS includes routing to a set of shared applications available to the customer domain.

9. The method of claim 1, wherein each of the first VNIC, the second VNIC, and the third VNIC maps to a virtualized I/O adapter in a virtual I/O server, and wherein the virtualized I/O adapter further maps to a physical I/O adapter.

10. The method of claim 1, wherein one of the second VNIC and the third VNIC is configured to use jumbo frames during installing software on the VM.

11. A computer program product comprising one or more computer-readable tangible storage devices and computer-readable program instructions which are stored on the one or more storage devices and when executed by one or more processors, perform the method of claim 1.

12. A computer system comprising one or more processors, one or more computer-readable memories, one or more computer-readable tangible storage devices and program instructions which are stored on the one or more storage devices for execution by the one or more processors via the one or more memories and when executed by the one or more processors perform the method of claim 1.

13. A computer program product for securing a customer domain in a virtualized multi-tenant environment, the computer program product comprising:
  one or more computer-readable tangible storage devices;
  program instructions, stored on at least one of the one or more storage devices, to configure a virtual machine (VM) for a customer in the customer domain;
  program instructions, stored on at least one of the one or more storage devices, to configure a first virtual network interface (VNIC) in the VM, wherein the first VNIC enables a first application on the VM to access a second application in a second VM in the customer domain;
  program instructions, stored on at least one of the one or more storage devices, to assign a first network address to the first VNIC, wherein the first network address is within a first network address range selected for the customer domain;
  program instructions, stored on at least one of the one or more storage devices, to configure a second VNIC in the VM, wherein the second VNIC enables a third application outside the customer domain to access the VM in the customer domain, and wherein the second VNIC is configured to use an addressing specification used by a server of the third application; and
  program instructions, stored on at least one of the one or more storage devices, to configure a third VNIC in the VM, wherein the third VNIC enables access from the first application to a fourth application executing outside the customer domain, and wherein the third VNIC is configured to use an addressing specification used by a server of the fourth application, thereby securing data communication relating to the customer domain from interference from data communication relating to a second customer domain.

14. The computer program product of claim 13, wherein the first network address range overlaps with a second network address range selected for the second customer domain.

15. The computer program product of claim 13, wherein the first address comprises an IPv4 address, and wherein the access to the second application is facilitated via a first virtual router instantiated within the customer domain.

16. The computer program product of claim 13, wherein the VM occupies a tier in the customer domain, and wherein the tier comprises at least three virtual local area networks, further comprising:
  program instructions, stored on at least one of the one or more storage devices, to assign a second network address to the second VNIC, wherein the second network address comprises an IPv6 address, and wherein the access from the third application is facilitated via a second virtual router instantiated within the customer domain.

17. The computer program product of claim 16, wherein the access from the third application is further facilitated via a first instance of a domain name service created for the customer domain, wherein the first instance of the DNS includes routing authorized for administration of the customer domain.

18. The computer program product of claim 13, further comprising:
  program instructions, stored on at least one of the one or more storage devices, to assign a third network address to the third VNIC, wherein the third network address comprises an IPv6 address, and wherein the access to the fourth application is facilitated via a third virtual router instantiated within the customer domain.

19. The computer program product of claim 13, further comprising:
  program instructions, stored on at least one of the one or more storage devices, to assign a third network address to the third VNIC, wherein the third network address is within the first network address range selected for the customer domain, and wherein the first network address range overlaps with a second network address range selected for a second customer domain, and wherein the access to the fourth application is facilitated via a third virtual router instantiated within the customer domain.

20. A computer system for securing a customer domain in a virtualized multi-tenant environment, the computer system comprising:
  one or more processors, one or more computer-readable memories and one or more computer-readable tangible storage devices;
  program instructions, stored on at least one of the one or more storage devices for execution by at least one of the one or more processors via at least one of the one or more memories, to configure a virtual machine (VM) for a customer in the customer domain;
  program instructions, stored on at least one of the one or more storage devices for execution by at least one of the one or more processors via at least one of the one or more memories, to configure a first virtual network interface (VNIC) in the VM, wherein the first VNIC enables a first application on the VM to access a second application in a second VM in the customer domain;
  program instructions, stored on at least one of the one or more storage devices for execution by at least one of the one or more processors via at least one of the one or more memories, to assign a first network address to the first VNIC, wherein the first network address is within a first network address range selected for the customer domain;
  program instructions, stored on at least one of the one or more storage devices for execution by at least one of the one or more processors via at least one of the one or more memories, to configure a second VNIC in the VM, wherein the second VNIC enables a third application outside the customer domain to access the VM in the customer domain, and wherein the second VNIC is configured to use an addressing specification used by a server of the third application; and
  program instructions, stored on at least one of the one or more storage devices for execution by at least one of the one or more processors via at least one of the one or more memories, to configure a third VNIC in the VM, wherein the third VNIC enables access from the first application to a fourth application executing outside the customer domain, and wherein the third VNIC is configured to use an addressing specification used by a server of the fourth application, thereby securing data communication relating to the customer domain from interference from data communication relating to a second customer domain.

* * * * *